(12) United States Patent
Van Foreest et al.

(10) Patent No.: US 10,303,857 B2
(45) Date of Patent: May 28, 2019

(54) PROVIDING ACCESS TO CONTENT

(71) Applicant: Irdeto B.V., Hoofddorp (NL)

(72) Inventors: Arnoud Evert Van Foreest, Hoofddorp (NL); Martin Soukup, Hoofddorp (NL)

(73) Assignee: IRDETO B.V., Ls Hoofddorp (NL)

( * ) Notice: Subject to any disclaimer, the term of this patent is extended or adjusted under 35 U.S.C. 154(b) by 154 days.

(21) Appl. No.: 15/519,177

(22) PCT Filed: Oct. 15, 2015

(86) PCT No.: PCT/EP2015/073872
§ 371 (c)(1),
(2) Date: Apr. 14, 2017

(87) PCT Pub. No.: WO2016/062609
PCT Pub. Date: Apr. 28, 2016

(65) Prior Publication Data
US 2017/0237551 A1      Aug. 17, 2017

(30) Foreign Application Priority Data
Oct. 22, 2014  (GB) .................................. 1418815.5

(51) Int. Cl.
*G06F 21/10*   (2013.01)
*H04L 9/00*    (2006.01)

(52) U.S. Cl.
CPC .............. *G06F 21/10* (2013.01); *H04L 9/002* (2013.01); *H04L 2209/16* (2013.01); *H04L 2209/603* (2013.01)

(58) Field of Classification Search
CPC ...................................................... G06F 21/10
See application file for complete search history.

(56) References Cited

U.S. PATENT DOCUMENTS 5,966,441 A  * 10/1999  Calamera ............ H04L 63/0428
                                                       713/167
6,289,455 B1 *  9/2001  Kocher ................ G06Q 20/367
                                                       380/228
(Continued)

FOREIGN PATENT DOCUMENTS

EP        2 227 014 A2    8/2010
EP        2 227 015 A2    9/2010
(Continued)

OTHER PUBLICATIONS

Liu et al.; Digital rights management for content distribution; Published in: Proceeding ACSW Frontiers '03 Proceedings of the Australasian information security workshop conference on ACSW frontiers 2003—vol. 21; ACM Digital Library (Year: 2003).*

(Continued)

*Primary Examiner* — Bradley Holder
(74) *Attorney, Agent, or Firm* — Rimon P.C.; Marc S. Kaufman

(57) ABSTRACT

A method of providing access to content at a first device, the method comprising: receiving an item of content, wherein at least part of the item of content is encrypted, the encrypted at least part of the item of content being decryptable using at least one decryption key; in a first software client: obtaining a transformed version of the at least one decryption key; performing a decryption operation on the encrypted at least part of the item of content based on the at least one decryption key to obtain an intermediate version of the at least part of the item of content, wherein said performing the decryption operation uses a white-box implementation of the decryption operation that forms part of the first software client and that operates using the transformed version of the at least one decryption key; and performing an encryption operation on at least a portion of the intermediate version based on at least one encryption key to obtain (Continued)

re-encrypted content, wherein said performing the encryption operation uses a white-box implementation of the encryption operation that forms part of the first software client; and providing, to a digital rights management client that executes on the first device, (a) a rights object that enables the digital rights management client to obtain one or more second decryption keys corresponding to the at least one encryption key, the one or more second decryption keys enabling the digital rights management client to decrypt the re-encrypted content and (b) the re-encrypted content.

29 Claims, 3 Drawing Sheets

(56) References Cited

U.S. PATENT DOCUMENTS

| | | | |
|---|---|---|---|
| 6,594,761 | B1 | 7/2003 | Chow et al. |
| 6,779,114 | B1 | 8/2004 | Chow et al. |
| 6,842,862 | B2 | 1/2005 | Chow et al. |
| 6,859,535 | B1* | 2/2005 | Tatebayashi ............ G06F 21/10 380/201 |
| 6,981,262 | B1* | 12/2005 | DeMello ................. G06F 21/10 719/310 |
| 7,350,085 | B2 | 3/2008 | Johnson et al. |
| 7,397,916 | B2 | 7/2008 | Johnson et al. |
| 8,401,188 | B1* | 3/2013 | Swaminathan ......... G06F 21/10 380/200 |
| 2004/0091116 | A1* | 5/2004 | Staddon ............. G06Q 20/3829 380/277 |
| 2004/0101138 | A1* | 5/2004 | Revital ................... G06F 21/10 380/210 |
| 2004/0103066 | A1* | 5/2004 | Staddon ............. G06Q 10/0639 705/80 |
| 2004/0111631 | A1* | 6/2004 | Kocher ................ G06Q 20/367 713/194 |
| 2004/0187027 | A1* | 9/2004 | Chan ...................... G06F 21/10 705/51 |
| 2005/0097056 | A1* | 5/2005 | DeMello ................. G06F 21/10 705/57 |
| 2005/0108556 | A1* | 5/2005 | DeMello ................. G06F 21/10 713/189 |

FOREIGN PATENT DOCUMENTS

| | | |
|---|---|---|
| EP | 2 273 405 A1 | 1/2011 |
| EP | 2 280 544 A1 | 2/2011 |
| EP | 2 360 918 A1 | 8/2011 |
| EP | 2 369 778 A1 | 9/2011 |
| EP | 2 506 176 A1 | 3/2012 |
| EP | 2 815 345 A1 | 12/2014 |
| WO | 2009/140774 A1 | 11/2009 |
| WO | 2013/120538 A1 | 8/2013 |
| WO | 2013/186274 A1 | 12/2013 |
| WO | 2016/026532 A1 | 2/2016 |
| WO | 2016/045746 A1 | 3/2016 |
| WO | 2016/062609 A1 | 4/2016 |

OTHER PUBLICATIONS

Zhang et al.; A flexible content protection system for media-on-demand; Published in: Fourth International Symposium on Multimedia Software Engineering, 2002. Proceedings; Date of Conference: Dec. 11-13, 2002; IEEE Xplore (Year: 2002).*

Stanley Chow et al. "White-Box Cryptography and an AES Implementation", Revision to appear in the post-proceedings of the 9th Annual Workshop on Selected Areas in Cryptography (SAC'02), Aug. 15-16, 2002.

Stanley Chow et al. "A White-Box DES Implementation for DRM Applications", Oct. 15, 2002; Pre-proceedings for ACM DRM-2002 workshop.

International Search Report and Written opinion received for PCT application No. PCT/EP2015/073872, dated Dec. 14, 2015.

Susan Hohenberger et al. "Securely Obfuscating Re-encryption", Feb. 21, 2007, Theory of Cryptography; [Lecture Notes in Computer Science;; LNCS]. Springer Berlin Heidelberg. Berlin. Heidelberg. pp. 233-252.

Farncombe: "The evolution of content protection" Jun. 2013. XP055233789, Retrieved from the Internet: URL:http://irdeto.com/documents/Archived/wp_evolution_of_content protection_famcombe.pdf [retrieved on Dec. 4, 2015].

"White Box Cryptography", Nov. 21, 2013, XP055233780, Retrieved from the Internet: URL:http://www.utc.edujcenter-information-security-assurance/pdfs/course-paper-5600-whitebox-crypt.pdf [retrieved on Dec. 4, 2015].

* cited by examiner

PROVIDING ACCESS TO CONTENT

FIELD OF THE INVENTION

The present invention relates to a method of providing access to content at a device, and apparatus and computer programs for carrying out the same.

BACKGROUND OF THE INVENTION

It is well-known to protect the delivery of one or more items of content (which may be in the form of, for example, a data stream). The item(s) of content may comprise any kind of content, such as one or more of audio content, image content, video content, multimedia content, text content, etc. For example, for broadcast content delivery infrastructures, conditional access (CA) systems enable the selective delivery of analog and/or digital signals (such as television signals) to broadcast receivers (such as set-top-boxes). For broadband infrastructures (such as delivery of content via the Internet), digital rights management (DRM) systems similarly enable the selective accessing and decoding of content for broadband receivers (such as personal computers, mobile telephones, etc.). It is known, in both CA and DRM systems, to use hardware tamper resistance (e.g. use of a smart card or a so-called "Trusted Execution Environment" or TEE) and/or software tamper resistance techniques (e.g. the use of so-called white-box protection techniques or software obfuscation techniques) to harden client device implementations against attacks.

Traditionally, CA systems have relied on hardware protected key management functionality, e.g. in the form of a smart card. In order to reduce the cost of implementations, in some CA systems the functionality of the smart card is implemented/provided by a secured software implementation that executes in the receiver device instead of using a smart card. Examples of such secure software implementations and the associated head-end functionality are set out, for example, in EP2227014, EP2227015 and EP2360918, the entire disclosures of which are incorporated herein by reference.

Some CA systems that are implemented without using a smart card rely on a proprietary hardware decryption module in a system-on-a-chip (SoC) device that forms part of the receiver (e.g. in the set top box). This proprietary hardware decryption module relies on a secret key that is loaded in this module during the manufacturing process of the SoC device (see, for example, EP2506176, the entire disclosure of which is incorporated herein by reference). This secret key is unique to the SoC device. The uniqueness of this secret key is used by the CA client (the CA software application executing on the receiver device) and links the CA client to the device, which helps to protect the CA client against reverse engineering attacks.

There is an increasing range of consumer electronic devices that use an open operating system (OS). An example of such an open OS is Android. Due to the open nature of such OSs, attackers have full knowledge of and control over the OS. This makes such an OS a very attractive platform for attackers. To reduce the impact of OS based attacks, hardware protection mechanisms have been deployed to harden or protect software applications against OS based attacks. Some SoC devices (such as some used in current consumer electronics devices) now support a TEE that in combination with firmware enable selected software applications achieve better protection against OS based attacks. Deploying a TEE-based hardware protection system for software applications requires the support of both chip manufacturers and CE manufacturers. This means that it is very difficult to achieve a broad range of devices to achieve protection of applications.

Some content owners mandate the use of a hardware-based DRM system for releasing their content to relatively open CE devices, such as Android based equipment. This means that many CE devices nowadays support at least one DRM system. Examples include SoC devices for television sets which currently support a DRM system for rendering streaming content.

SUMMARY OF THE INVENTION

The dependency of a CA system on a specific hardware key ladder does not easily scale to a wide range of CE devices and the SoC devices that they use. This lack of scaling reduces the percentage of overall CE devices (e.g. televisions and set top boxes) that can support any particular CA system and, therefore, potentially limits the range of content that a particular CE device is able to access.

According to a first aspect of the invention, there is provided a method of providing access to content at a first device, the method comprising: receiving an item of content, wherein at least part of the item of content is encrypted, the encrypted at least part of the item of content being decryptable using at least one decryption key; in a first software client: obtaining a transformed version of the at least one decryption key; performing a decryption operation on the encrypted at least part of the item of content based on the at least one decryption key to obtain an intermediate version of the at least part of the item of content, wherein said performing the decryption operation uses a white-box implementation of the decryption operation that forms part of the first software client and that operates using the transformed version of the at least one decryption key; and performing an encryption operation on at least a portion of the intermediate version based on at least one encryption key to obtain re-encrypted content, wherein said performing the encryption operation uses a white-box implementation of the encryption operation that forms part of the first software client; and providing, to a digital rights management client that executes on the first device, (a) a rights object that enables the digital rights management client to obtain one or more second decryption keys corresponding to the at least one encryption key, the one or more second decryption keys enabling the digital rights management client to decrypt the re-encrypted content and (b) the re-encrypted content.

The first software client essentially enables a software-based bridge to the DRM client that is installed on, or that executes on, the first device. The use of the one or more encryption keys for the transcryption essentially ties the first software client with the DRM client, so that the first software client can link with, or make use of and leverage, the properties of the DRM client (such as being anchored to the device and executing in a protected hardware environment) and/or the functionality of the DRM client 206 (such as its ability to perform DRM processing in according with a particular DRM system) without the first software client having to provide those properties or that functionality itself. Thus, the DRM client, with its beneficial properties and functionality, may be pre-installed or pre-configured on the device (such as within a TEE of the device) and yet, with embodiments of the invention, one can make use of the first software client to process content (where the content is protected according to a DRM or CA system that is not necessarily compatible with the DRM client) and access it through the DRM client already on the device. This means that devices can be opened up to be able to access much more content that has been protected in many different ways, whilst still providing secured access (by virtue of the use of the DRM client). For example, it is possible to download onto the device multiple different "first software clients" to handle many different types of protected content that the user of the device may wish to access—this mechanism provides flexibility whilst maintaining a high level of security. Another advantage is that, for example, if the DRM client is anchored or locked to the device, then the first software client does itself not need to be anchored or locked in this way—anchoring/locking is still achieved by virtue of the first software client's interaction with the DRM client and the DRM client's own anchoring/locking.

In some embodiments, the first software client executes on the first device. Alternatively, the first software client may execute on a second device different from the first device.

In some embodiments, the digital rights management client is anchored to the first device.

In some embodiments, the digital rights management client is arranged to execute in a protected hardware processing environment of the first device.

In some embodiments, the at least one encryption key is: (a) unique to the first device or (b) unique to a predetermined group of devices that includes the first device or (c) unique to the instance of the DRM client that executes on the first device.

In some embodiments, the first software client is one of: (a) a conditional access client; (b) part of a conditional access client; (c) a second digital rights management client; (d) part of a second digital rights management client.

In some embodiments, the first software client is not anchored to a device on which the first software client executes.

In some embodiments, the first software client is arranged to execute in an unprotected hardware processing environment of the device on which the first software client executes.

In some embodiments, the method comprises the first software client receiving a transformed version of the at least one encryption key.

In some embodiments, code for the first software client has embedded therein a transformed version of the at least one encryption key.

In some embodiments, code for the first software client has embedded therein the rights object.

In some embodiments, the first software client is arranged to control the decryption operation and/or the encryption operation based, at least in part, on whether the first software client detects a valid entitlement to access the item of content.

In some embodiments, the first software client obtains the transformed version of the one or more decryption keys from one or more entitlement control messages communicated over a broadcast network.

In some embodiments, the item of content is received over a broadcast network. Alternatively, the item of content may be received over a broadband network (which may comprise the Internet).

In some embodiments, the at least one encryption key is not associated with the item of content.

In some embodiments, (a) the decryption operation is based, at least in part, on an AES decryption algorithm or on a triple-DES decryption algorithm; and/or (b) the encryption operation is based, at least in part, on an AES encryption algorithm or on a triple-DES encryption algorithm.

In some embodiments, the transformation applied to the at least one decryption key to obtain the transformed version of the at least one decryption key is associated with the particular white-box implementation of the decryption operation that forms part of the first client software.

In some embodiments, the decryption operation and the encryption operation operate, at least in part, on data in one or more transform domains different from a domain for data of the item of content.

In some embodiments, the white-box implementation of the decryption operation and/or the white-box implementation of the encryption operation is unique to a device on which the first software client executes or to a predetermined group of devices that includes a device on which the first software client executes.

In some embodiments, the method comprises modifying the intermediate version prior to encrypting the intermediate version, the encrypting then comprising encrypting at least a portion of the modified intermediate version. The modifying may comprise one or more of: (a) embedding a watermark in at least a part of the intermediate version; (b) embedding a fingerprint in at least a part of the intermediate version; and (c) converting the intermediate version from a first format to a second format.

In some embodiments, the at least a portion of the intermediate version is not all of the intermediate version. The method may then comprise providing at least some of the item of content that does not correspond to the at least a portion of the intermediate version to the digital rights management client.

In some embodiments, the first device comprises one of: (a) a mobile telephone; (b) a tablet computer; (c) a portable personal electronics device; (d) a games console; (e) a personal computer; (f) a television.

In some embodiments, the white-box implementation of the decryption operation and the white-box implementation of the encryption operation are implemented together as a single white-box implementation.

According to a second aspect of the invention, there is provided an apparatus arranged to carry out any one of the above-described methods according to the first aspect.

According to a third aspect of the invention, there is provided one or more computer programs which, when executed by one or more processors, causes the one or more processors to carry out any one of the above-described methods according to the first aspect. The one or more computer programs may be stored on one or more computer-readable media.

According to a fourth aspect of the invention, there is provided a method of configuring a device, the method comprising: loading, onto the device, the one or more computer programs according to the third aspect of the invention.

In some embodiments, the method comprises obtaining the one or more computer programs from a store that stores a plurality of applications that are available for download to, and execution on, the device. The store may be accessed via a website.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System overview

Figure 1:
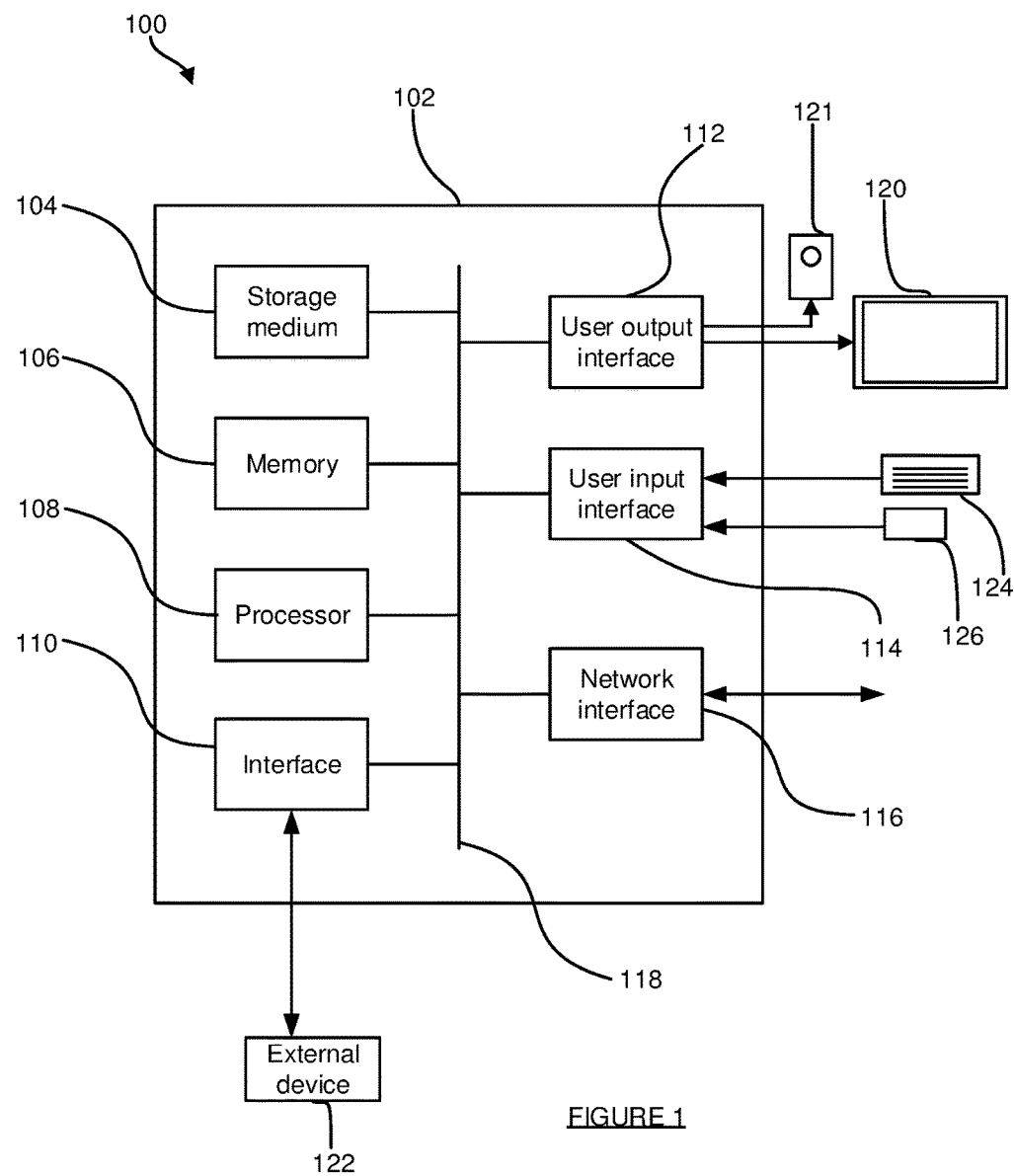
FIG. 1 schematically illustrates an example of a computer system.

FIG. 1 schematically illustrates an example of a computer system 100. The system 100 comprises a computer 102. The computer 102 comprises: a storage medium 104, a memory 106, a processor 108, an interface 110, a user output interface 112, a user input interface 114 and a network interface 116, which are all linked together over one or more communication buses 118.

The storage medium 104 may be any form of non-volatile data storage device such as one or more of a hard disk drive, a magnetic disc, an optical disc, a ROM, etc. The storage medium 104 may store an operating system for the processor 108 to execute in order for the computer 102 to function. The storage medium 104 may also store one or more computer programs (or software or instructions or code).

The memory 106 may be any random access memory (storage unit or volatile storage medium) suitable for storing data and/or computer programs (or software or instructions or code).

The processor 108 may be any data processing unit suitable for executing one or more computer programs (such as those stored on the storage medium 104 and/or in the memory 106), some of which may be computer programs according to embodiments of the invention or computer programs that, when executed by the processor 108, cause the processor 108 to carry out a method according to an embodiment of the invention and configure the system 100 to be a system according to an embodiment of the invention. The processor 108 may comprise a single data processing unit or multiple data processing units operating in parallel, separately or in cooperation with each other. The processor 108, in carrying out data processing operations for embodiments of the invention, may store data to and/or read data from the storage medium 104 and/or the memory 106.

The interface 110 may be any unit for providing an interface to a device 122 external to, or removable from, the computer 102. The device 122 may be a data storage device, for example, one or more of an optical disc, a magnetic disc, a solid-state-storage device, etc. The device 122 may have processing capabilities—for example, the device may be a smart card. The interface 110 may therefore access data from, or provide data to, or interface with, the device 122 in accordance with one or more commands that it receives from the processor 108.

The user input interface 114 is arranged to receive input from a user, or operator, of the system 100. The user may provide this input via one or more input devices of the system 100, such as a mouse (or other pointing device) 126 and/or a keyboard 124, that are connected to, or in communication with, the user input interface 114. However, it will be appreciated that the user may provide input to the computer 102 via one or more additional or alternative input devices (such as a touch screen). The computer 102 may store the input received from the input devices via the user input interface 114 in the memory 106 for the processor 108 to subsequently access and process, or may pass it straight to the processor 108, so that the processor 108 can respond to the user input accordingly.

The user output interface 112 is arranged to provide a graphical/visual and/or audio output to a user, or operator, of the system 100. As such, the processor 108 may be arranged to instruct the user output interface 112 to form an image/video signal representing a desired graphical output, and to provide this signal to a monitor (or screen or display unit) 120 of the system 100 that is connected to the user output interface 112. Additionally or alternatively, the processor 108 may be arranged to instruct the user output interface 112 to form an audio signal representing a desired audio output, and to provide this signal to one or more speakers 121 of the system 100 that is connected to the user output interface 112.

Finally, the network interface 116 provides functionality for the computer 102 to download data from and/or upload data to one or more data communication networks.

It will be appreciated that the architecture of the system 100 illustrated in FIG. 1 and described above is merely exemplary and that other computer systems 100 with different architectures (for example with fewer components than shown in FIG. 1 or with additional and/or alternative components than shown in FIG. 1) may be used in embodiments of the invention. As examples, the computer system 100 could comprise one or more of: a personal computer; a server computer a mobile telephone; a tablet; a laptop; a television set; a set top box; a games console; other mobile devices or consumer electronics devices; etc.

2—White-box implementations

A white-box environment is an execution environment for software data processing in which an attacker of the data processing is assumed to have full access to, and visibility of, the data being operated on (including intermediate values), memory contents and execution/process flow of the software data processing. Moreover, in the white-box environment, the attacker is assumed to be able to modify the data being operated on, the memory contents and the execution/process flow of the software data processing—in this way, the attacker can experiment on, and try to manipulate the operation of, the data processing, with the aim of circumventing initially intended functionality and/or identifying secret information and/or for other purposes. Indeed, one may even assume that the attacker is aware of the underlying algorithm being performed by the data processing. However, the data processing may need to use secret information (e.g. one or more cryptographic keys), where this information needs to remain hidden from the attacker. Similarly, it would be desirable to prevent the attacker from modifying the execution/control flow of the data processing, for example preventing the attacker forcing the data processing to take one execution path after a decision block instead of a legitimate execution path. A "white-box" attack is an attack that an attacker may perform on software data processing (for example to try to ascertain secret information or to modify the execution/control flow of the data processing so as to achieve a desired goal/aim) when the data processing is performed in a white-box environment. White-box attacks are well-known. White-box attacks are attacks performed on items of software (or code or instructions), as the attacker can execute (or run or emulate) such items of software in a software environment (such as a debugger) which enables the attacker to monitor and modify data values in memory and/or control flow during execution.

In some embodiments, one or more bijective functions (or transformations or transforms) will be used. A bijective function is a function that is injective (i.e. is a 1-to-1 mapping) and that is surjective (i.e. maps onto the whole of a particular range of values). If the domain of possible input values for the function T is domain Dom, and if the function T is an injective function (so that $T(a)=T(b)$ if and only if $a=b$), then T is a bijective function from Dom onto the range $T(Dom)=\{T(a): a \in Dom\}$.

An initial simple example will help understand how the use of bijective functions T can help provide protection against white-box attacks. In this example, the bijective functions T are linear transformations in a Galois field $GF(\psi^n)$ for some prime number q and positive integer n, i.e. $T: GF(\psi^n) \rightarrow GF(\psi^n)$. For example, if data values $s_i$ (i=1, ..., m) are Z-bit data values, then they may be viewed as elements of the Galois field $GF(2^Z)$, so that $\psi=2$ and $n=Z$.

Consider a predetermined function G that operates on elements $s_1$ and $s_2$ in the Galois field $GF(\psi^n)$ according to $r=G(s_1,s_2)=s_1+s_2$, where + is addition in the Galois field $GF(\psi^n)$. In this Galois field $GF(\psi^n)$, the addition $s_1+s_2$ is the same as an XOR operation, so that $r=G(s_1,s_2)=s_1 \oplus s_2$. Let $s_1^*$, $s_2^*$ and $r^*$ be transformed versions of $s_1$, $s_2$ and r according to respective linear transformations $T_1$, $T_2$ and $T_3$ in the Galois field $GF(\psi^n)$, so that $s_1^*=T_1(s_1)=a \cdot s_1+b$, $s_2^*=T_2(s_2)=c \cdot s_2+d$ and $r^*=T_3(r)=e \cdot r+f$ for arbitrary non-zero constants a, c, and e in the Galois field $GF(\psi^n)$, and arbitrary constants b, d and f in the Galois field $GF(\psi^n)$ (so that constants a, c, and e may be randomly chosen from $GF(\psi^n)/\{0\}$ and constants b, d, and f may be randomly chosen from $GF(\psi^n)$). Then $r^*=e \cdot (s_1+s_2)+f=e \cdot (a^{-1}(s_1^*+b)+c^{-1}(s_2^*+d))+f=g \cdot s_1^*+h \cdot s_2^*+i$, where $g=e \cdot a^{-1}$, $h=e \cdot c^{-1}$ and $i=e \cdot (a^{-1}b+c^{-1}d)+f$.

Thus, given the transformed versions $s_1^*=T_1(s_1)$ and $s_2^*=T_2(s_2)$ of the inputs $s_1$ and $s_2$, it is possible to calculate the transformed version $r^*=T_3(r)$ of the result r without having to remove any of the transformations (i.e. without having to derive $s_1$ and/or $s_2$ from the versions $s_1^*$ and $s_2^*$). In particular, having defined the transformations $T_1$, $T_2$ and $T_3$ by their respective parameters (a and b for $T_1$, c and d for $T_2$, e and f for $T_3$), a transformed version $G^*$ of the function G can be implemented according to $G^*(s_1^*,s_2^*)=g \cdot s_1^*+h \cdot s_2^*+i$, where $g=e \cdot a^{-1}$, $h=e \cdot c^{-1}$ and $i=e \cdot (a^{-1}b+c^{-1}d)+f$, so that $r^*=G^*(s_1^*,s_2^*)$ can be calculated without determining/revealing $s_1$ or $s_2$ as an intermediate step in the processing. The result r can then be obtained from the transformed version $r^*=G^*(s_1^*,s_2^*)$ of the result r, as $r=e^{-1}(r^*+f)$—thus, a linear transformation $T_4$ (which is the inverse of $T_3$) can be used to obtain the result r from the transformed version $r^*$, where $r=T_4(r^*)=e^{-1}r^*+e^{-1}f$. Alternatively, the transformed version $r^*$ of the result r could be an input to a subsequent function. In other words, given the function G that operates on inputs $s_1$ and $s_2$ to produce a result r, if transformations $T_1$, $T_2$ and $T_3$ are specified (e.g. randomly, by choosing the parameters for the transformations randomly, or based on some other parameters/data), then a transformed version $G^*$ of the function G can be generated/implemented, where the function $G^*$ operates on transformed inputs $s_1^*=T_1(s_1)$ and $s_2^*=T_2(s_2)$ to produce a transformed result $r^*=T_3(r)$ according to $r^*=g \cdot s_1^*+h \cdot s_2^*+i$. If a person implements the function $G^*$ in a white-box environment, then that person cannot identify what operation the underlying function G is performing, nor can the person determine the actual result r nor in inputs $s_1$ and $s_2$ (since these values are never revealed when performing the function $G^*$).

As another example, suppose that the function G operates on element $s_1$ in the Galois field $GF(\psi^n)$ according to $r=G(s_1)=s_1+k$, where + is addition in the Galois field $GF(\psi^n)$ and k is a predetermined secret value (such as a cryptographic key). In this Galois field $GF(\psi^n)$, the addition $s_1+k$ is the same as an XOR operation, so that $r=G(s_1)=s_1 \oplus k$. Let $s_1^*$ and $r^*$ be transformed versions of $s_1$ and r according to respective linear transformations $T_1$ and $T_3$ in the Galois field $GF(\psi^n)$, so that $s_1^*=T_1(s_1)=a \cdot s_1+b$ and $r^*=T_3(r)=e \cdot r+f$ for arbitrary non-zero constants a and e in the Galois field $GF(\psi^n)$, and arbitrary constants b and f in the Galois field $GF(\psi^n)$ (so that constants a and e may be randomly chosen from $GF(\psi^n)/\{0\}$ and constants b and f may be randomly chosen from $GF(\psi^n)$). Then $r^*=e \cdot (s_1+k)+f=e \cdot (a^{-1}(s_1^*+b)+k)+f=g \cdot s_1^*+h$, where $g=e \cdot a^{-1}$ and $h=e \cdot (a^{-1}b+k)+f$.

Thus, given the transformed version $s_1^*=T_1(s_1)$ of the input $s_1$, it is possible to calculate the transformed version $r^*=T_3(r)$ of the result r without having to remove any of the transformations (i.e. without having to derive $s_1$ from the version $s_1^*$). In particular, having defined the transformations $T_1$ and $T_3$ by their respective parameters (a and b for $T_1$, e and f for $T_3$), a transformed version $G^*$ of the function G can be implemented according to $G^*(s_1^*)=g \cdot s_1^*+h$, where $g=e \cdot a^{-1}$, $h=e \cdot (a^{-1}b+k)+f$, so that $r^*=G^*(s_1^*)$ can be calculated without determining/revealing $s_1$ and without the secret value k being available to an attacker. The result r can then be obtained from the transformed version $r^*=G^*(s_1^*, s_2^*)$ of the result r, as $r=e^{-1}(r^*+f)$—thus, a linear transformation $T_4$ (which is the inverse of $T_3$) can be used to obtain the result r from the transformed version $r^*$, where $r=T_4(r^*)=e^{-1}r^*+e^{-1}f$. Alternatively, the transformed version $r^*$ of the result r could be an input to a subsequent function. In other words, given the function G that operates on inputs $s_1$ to produce a result r, if transformations $T_1$ and $T_3$ are specified (e.g. randomly, by choosing the parameters for the transformations randomly, or based on some other parameters/data), then a transformed version $G^*$ of the function G can be generated/implemented, where the function $G^*$ operates on the transformed input $s_1^*=T_1(s_1)$ to produce a transformed result $r^*=T_3(r)$ according to $r^*=g \cdot s_1^*+h$. If a person implements the function $G^*$ in a white-box environment, then that person cannot identify what operation the underlying function G is performing, nor can the person determine the actual result r nor the input $s_1$ nor the secret key k (since these values are never revealed when performing the function $G^*$).

Note that in the above examples, it is possible for one or both of $T_1$ and $T_2$ to be the identity transformation (i.e. $T_1$ is the identity transformation if $T_1(s_1)=s_1$ for all values of $s_1$, so that a=1 and b=0 in the above example, and $T_2$ is the identity transformation if $T_2(s_2)=s_2$, so that c=1 and d=0 in the above example). If this is the case, then the person implementing the function $G^*$ can identify the value assumed by the input $s_1$ (if $T_1$ is the identity transformation) and/or the value assumed by the input $s_2$ (if $T_2$ is the identity transformation). However, so long as $T_3$ is not the identity transformation, then that person cannot identify what operation the underlying function G is performing, nor can the person determine the actual result r.

Similarly, in the above examples, it is possible for $T_3$ to be the identity transformation (i.e. $T_3$ is the identity transformation if $T_3(r)=r$ for all values of r, so that e=1 and f=0 in the above example). If this is the case, then the person implementing the function $G^*$ can identify the value assumed by the output r. However, so long as one or both of $T_1$ and $T_2$ are not the identity transformation, then that person cannot identify what operation the underlying function G is performing, nor can the person determine one or both of the initial inputs $s_1$ and $s_2$.

It will be appreciated that other functions G could be implemented as a corresponding "transformed version" G*, where the input(s) to the function G* are transformed versions of the input(s) to the function G according to respective injective (1-to-1) transformations and the output(s) of the function G* are transformed versions of the output(s) of the function G according to respective injective transformations. The transformations need not necessarily be linear transformations as set out above, but could be any other kind of injective transformation. Thus, given a function G that has u inputs $\alpha_1, \ldots, \alpha_u$ and v outputs $\beta_1, \ldots, \beta_v$, a transformed version G* of the function G can be implemented, where G* has transformed versions $\alpha_1^*, \ldots, \alpha_u^*$ of the inputs $\alpha_1, \ldots, \alpha_u$ as its input and outputs transformed versions $\beta_1^*, \ldots, \beta_v^*$ of the outputs $\beta_1, \ldots, \beta_v$, where $\alpha_i^* = T_i(\alpha_i)$ and $\beta_i^* = T_{i+u}(\beta_i)$ for injective functions $T_1, \ldots, T_{u+v}$. It is possible that two or more of the functions $T_1$ might be the same as each other. The fact that this can be done for any function G is discussed below.

As set out below, the XOR operation, along with conditional branching on constants, forms a system which is Turing complete. This means that any mathematical function can be implemented using only (a) zero or more XOR operations and (b) zero or more conditional branchings on constants.

A Turing machine is a notional device that manipulates symbols on a strip of tape according to a table of rules. Despite its simplicity, a Turing machine can be adapted to simulate the logic of any computer algorithm. The Turing machine mathematically models a machine that mechanically operates on a tape. On this tape are symbols which the machine can read and write, one at a time, using a tape head. Operation is fully determined by a finite set of elementary instructions such as "in state 42, if the symbol seen is 0, write a 1; if the symbol seen is 1, change into state 17; in state 17, if the symbol seen is 0, write a 1 and change to state 6" etc. More precisely, a Turing machine consists of:
  1. A tape which is divided into cells, one next to the other. Each cell contains a symbol from some finite alphabet. The alphabet contains a special blank symbol (here written as 'B') and one or more other symbols. The tape is assumed to be arbitrarily extendable to the left and to the right, i.e. the Turing machine is always supplied with as much tape as it needs for its computation. Cells that have not been written to before are assumed to be filled with the blank symbol.
  2. A head that can read and write symbols on the tape and move the tape left and right one (and only one) cell at a time.
  3. A state register that stores the current state of the Turing machine, one of finitely many states. There is one special start state with which the state register is initialized.
  4. A finite table (occasionally called an action table or transition function) of one or more instructions (each usually expressed as a respective quintuple $S_i a_j \rightarrow S_{i1} a_{j1} d_k$) that specifies that: if the Turing machine is currently in the state $S_i$ and has currently read the symbol $a_j$ from the tape (i.e. the symbol currently under the head is $a_j$), then the Turing machine should carry out the following sequence of operations:
     Write $a_{j1}$ in place of the current symbol $a_j$. (Symbol $a_{j1}$ could be the blank symbol).
     Control the position of the head, as described by $d_k$. $d_k$ can have values: 'L' to indicate moving the head one cell left, 'R' to indicate moving the head one cell right; or 'N' to indicate not moving the head, i.e. staying in the same place.
     Set the current state to be the state specified by $S_{i1}$ (which may be the same as, or different from, $S_i$).

Turing machines are very well-known and shall, therefore, not be described in more detail herein.

If it can be shown that any possible 5-tuple in the action table can be implemented using the XOR operation and conditional branching on constants, then we know that a processing system based on the XOR operation and conditional branching on constants is Turing complete (since any function or computer program can be implemented or modelled as a Turing machine, and all of the 5-tuples in the action table of that Turing machine can be implemented using the XOR operation and conditional branching on constants).

Consider the following mappings between the elements in the Turing machine and those in a system that uses only XORs and conditional branching on constants:
  (a) The alphabet size of the Turing machine is set to the size $\psi^n$ of the alphabet $GF(\psi^n)$.
  (b) Each state is implemented as a block of code with an identifier (used to jump to). Hence, the next state in the Turing machine can be realized by the Go To statement, conditioned on the current state and the content of the memory (i.e. conditional branching based on constants).
  (c) The tape can be implemented as a memory holding the binary representation of the elements in the alphabet. Hence, the movements in the tape can be realized by changing the address pointing to the memory.
  (d) A global variable, referred to as "Address", is used to point to the memory location equivalent to the tape section under the head.
  (e) We read the memory content using its address. To write into the memory, we XOR the memory content with a constant that yields the desired value.

The following pseudo-code shows a typical state implementation (for the state with identifier "i"), where values $X_1, X_2, \ldots, X_q$ are constants and "Addr" is the pointer to a memory location. The example shown below illustrates the three possibilities of incrementing, decrementing and not-changing the address "Addr" variable.

```
Block i:
{
  Mem = Memory(Addr)    // Read data stored on the tape at the current
                        address Addr
  Begin switch (Mem)
    case 1: {Memory(Addr) = XOR(Mem, X₁), Addr++, Go to Block j₁}
                        // If the data read equals 1, then write the
                        value 1⊕X₁ to the tape, move the head to the
                        right, and go to state j₁
    case 2: {Memory(Addr) = XOR(Mem, X₂), Addr--, Go to Block j₂}
                        // If the data read equals 2, then write the
                        value 2⊕X₂ to the tape, move the head to the
                        left, and go to state j₂
    .
    .
    .
    case q: {Memory(Addr) = XOR(Mem, X_q), Addr, Go to Block j_q}
                        // If the data read equals q, then write the
                        value q⊕X_q to the tape, keep the head at its
                        current position, and go to state j_q
  end switch (Mem)
}
```

Thus, any possible 5-tuple in the action table can be implemented using the XOR operation and conditional branching. Hence, a system based on the XOR operation and conditional branching is Turing complete, i.e. any Turing machine can be implemented using only XORs (for point (e) above) and conditional jumps (for point (b) above).

As shown above, it is possible to perform an operation in the transformed domain (via the function G*) that is equivalent to $r=s_1 \oplus s_2$ without ever removing the transformations on $r^*$, $s_1^*$ or $s_2^*$. A conditional jump is implemented using the capabilities of the programming language. This means that it is possible to implement any mathematical operation in the transformed domain without ever removing the transformations on the data elements being processed. In other words, given any function G that has u inputs $\alpha_1, \ldots, \alpha_u$ ($u \geq 1$) and v outputs $\beta_1, \ldots, \beta_v$, ($v \geq 1$), a transformed version G* of the function G can be implemented, where G* is a function that has transformed versions $\alpha_1^*, \ldots, \alpha_u^*$ of the inputs $\alpha_1, \ldots, \alpha_u$ as its input(s) and that outputs transformed versions $\beta_1^*, \ldots, \beta_v^*$ of the output(s) $\beta_1, \ldots, \beta_v$, where $\alpha_i^* = T_i(\alpha_i)$ and $\beta_i^* = T_{i+u}(\beta_i)$ for injective functions $T_1, \ldots, T_{u+v}$. It is possible that two or more of the functions $T_i$ might be the same as each other. As set out above, the injective functions $T_1, \ldots, T_{u+v}$ may be defined (e.g. randomly generated injective functions), and, given the particular injective functions $T_1, \ldots, T_{u+v}$, that are defined, a particular transformed version G* of the function G results (or is defined/obtained/implemented).

The use of bijective functions T to obfuscate the implementation of a predetermined function, and the various methods of such use, are well-known in this field of technology—see, for example: "*White-Box Cryptography and an AES Implementation*", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002; "*A White-Box DES Implementation for DRM Applications*", by Stanley Chow, Phil Eisen, Harold Johnson, and Paul C. van Oorschot, in Digital Rights Management: ACM CCS-9 Workshop, D R M 2002, Washington, D.C., USA, Nov. 18, 2002; US 61/055,694; WO2009/140774; U.S. Pat. Nos. 6,779,114; 7,350,085; 7,397,916; 6,594,761; and 6,842,862, the entire disclosures of which are incorporated herein by reference.

3—Software CA and DRM clients

Embodiments of the present invention enable the provision of a software-only CA client that can be deployed on an unmanaged device, i.e. on a device without (or that does not implement or expose to third-party implementers) a hardware key ladder.

Embodiments of the invention make use of a DRM client that executes on an unmanaged device (e.g. a native, OEM-hardened or "device vendor"-hardened DRM client). Such DRM clients are typically present on unmanaged devices. In some embodiments, such DRM clients may leverage device proprietary techniques of the device to anchor or lock the DRM client (and any DRM keys) to a specific device. This means that a specific instance or version of the DRM client can only execute on that specific device (i.e. if that instance or version of the DRM client were copied to a different device, then it would not execute correctly, or possibly would not execute at all, on that different device). Such DRM clients may make use of hardware hooks that are proprietary to the device vendor and that are not exposed to third-party vendors as public APIs—this is considered to provide strong anchoring of a DRM client to the device.

An example of the DRM technology involved in some embodiments of the invention is the WideVine DRM that executes on the Android OS on unmanaged devices. Thus, in some embodiments of the invention, the DRM client is a WideVine DRM client. It will be appreciated, however, that this is purely an example, and that embodiments of the invention may make use of other DRM technologies.

In embodiments of the invention, the CA client that is used does not necessarily implement its own anchoring mechanism, but rather defers this responsibility to the DRM client. In other words, the CA client in some embodiments of the invention is not anchored or locked to the device on which the CA client executes.

As will become apparent, in some embodiments, the DRM client and the CA client execute on the same device. In other embodiments, the DRM client and the CA client execute in different devices—for example, in embodiments targeted at a home networking scenario, content may be received on an unmanaged device on which the CA client executes and which does not have a native, hardened DRM client; the content may then be redistributed (after having been processed using the CA client) to another unmanaged device on which the native, hardened DRM client is present.

Figure 2:
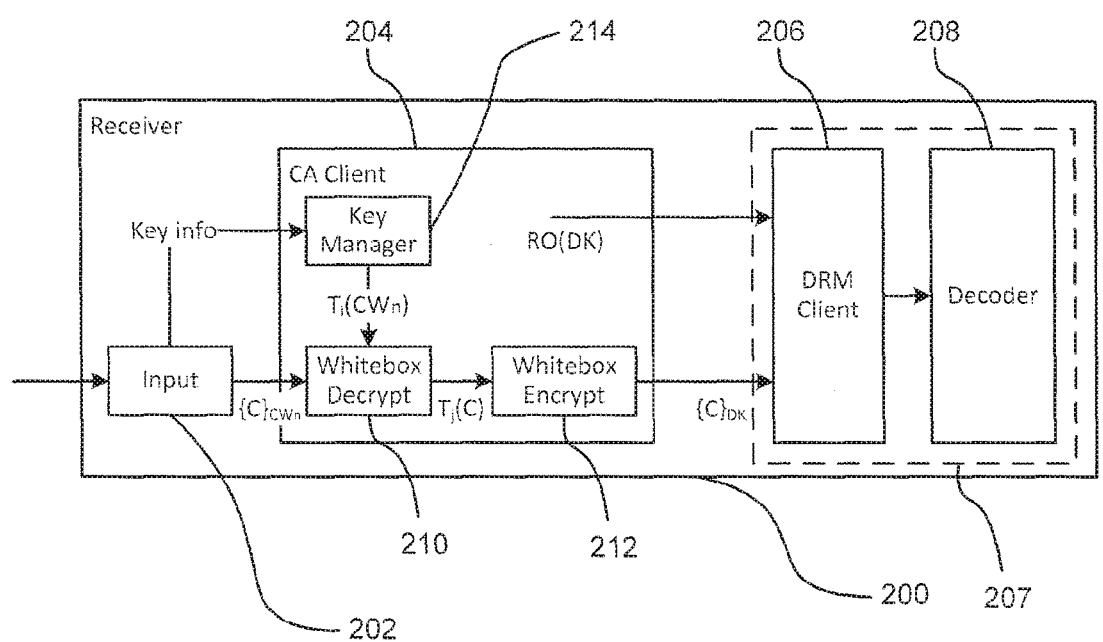
FIG. 2 schematically illustrates a device (or receiver) according to an embodiment of the invention.

FIG. 2 schematically illustrates a device (or receiver) 200 according to an embodiment of the invention. The device 200 comprises, or is arranged to execute, an input 202, a CA client 204, a DRM client 206 and a decoder 208.

The DRM client 206 and/or the decoder 208 may be implemented in or as part of, or may execute in, a trusted execution environment 207 (or a protected hardware processing environment). This trusted execution environment is a secured area of a processor of the device 200, for example a secured part of a SoC device of the device 200. Such trusted execution environments are well-known and shall not, therefore, be described in detail herein.

The DRM client 206 may be, for example, a Level 1 Platform DRM client. The DRM client 206 may be, for example, a WideVine DRM client. In general, though, the DRM client 206 is arranged to receive a protected (or secured or encrypted) item of content and a rights object (or a DRM license). The rights object contains information (such as one or more cryptographic keys) that allows or enables the DRM client 206 to access (or decrypt) the received protected item of content and to use the item of content (where the use is, potentially, limited, or subject, to one or more restrictions or conditions, which often referred to as "output protections"). The DRM client 206 may be a stand-alone DRM client 206; alternatively, the DRM client 206 may need to interact with an external DRM server (not shown in FIG. 2) in order to carry out its DRM functionality. As DRM clients, rights objects, and DRM functionality in general are well-known, they shall not be described in more detail herein.

The decoder 208 is a content decoder capable of receiving a decrypted/accessed item of content output from the DRM client 206 and performing one or more content decoding operations (such as decompression, format conversion, etc.). As mentioned, the item of content may comprise any kind of content, such as one or more of audio content, image content, video content, multimedia content, text content, etc. The operation(s) performed by the decoder 208 may, therefore, be dependent on the nature of the content—for example, if the item of content contains compressed video content, then the decoder 208 may perform a video decompression operation. There may, therefore, be a single decoder 208 or multiple decoders 208 that operate on different respective types of content.

The DRM client 206 and the decoder 208 may be implemented as software or firmware for execution in the trusted execution environment of the device 200. In other embodiments, one or both of DRM client 206 and the decoder 208 may be implemented as one or more secured hardware components of the device 200.

The CA client 204 is implemented as one or more software modules/components (or computer programs). The device 200 does not execute the CA client 204 in the trusted execution environment, i.e. the device 200 executes the CA client 204 in an unprotected hardware processing environment, such as a main processor of a SoC device of the device 200. Consequently, the CA client 204 operates, or executes, in a white-box environment. Consequently, the CA client 204 is implemented as a secured or protected CA client 204—the implementation of the CA client 204 may use one or more of the above-mentioned techniques (in section 2), or any other white-box protection techniques, to provide protection against white-box attacks. Similarly, other software protection techniques (such as node locking, obfuscation, etc.) as are known in this field of technology may be used to implement the CA client 204.

The device 200 is arranged to receive, at the input 202, an item of content (C). The item of content (C) is received at the input in a form in which at least part of the item of content (C) is encrypted, the encrypted at least part of the item of content being decryptable using at least one decryption key, referred to herein as control words. In FIG. 2, the at least one decryption key is represented as CWn (where n is an index for the one or more decryption keys). The item of content (C), at least part of which is encrypted, is represented as $\{C\}_{CW_n}$. In general, in this specification, data D that is at least partially encrypted and that can be decrypted using a key K is represented as $\{D\}_K$. Thus, the input receives the item of content (C) in the form $\{C\}_{CW_n}$.

The received item of content $\{C\}_{CW_n}$ is not necessarily in a format suitable for processing by the DRM client 206. For example, the received item of content $\{C\}_{CW_n}$ may be part of a broadcast stream according to a DVB standard (for example with MPEG2 video), and the DRM client 206 is unable to process such content in that form. As will be described below, the CA client 204 performs CA processing on the received (protected) item of content $\{C\}_{CW_n}$ and may output suitable information to the DRM client 206 to enable the DRM client to access/process the item of content (C). This is particularly useful when the DRM client 206 is a pre-installed component of the device 200 and the user, subsequent to purchase of the device 200, wishes to use the device 200 to access a protected item of content that is not compatible with the DRM client 206—embodiments of the invention enable the user to access the protected item of content in a secured manner.

The CA client 206 comprises (or implements) a white-box implementation of a decryption operation 210 and a white-box implementation of an encryption operation 212. These implementations 210 and 220 may be separate components of the CA client 206 or may be implemented as a single white-box implementation within the CA client 206.

The CA client 206 is arranged to obtain a transformed version of the at least one decryption key CWn—this obtaining shall be described in more detail later. The transformed version of the at least one decryption key CWn shall be referred to herein as $T_i(CWn)$, illustrating that transformed version $T_i(CWn)$ of the at least one decryption key CWn corresponds to the at least one decryption key CWn under one or more transforms $T_i$ applied to the at least one decryption key CWn. The one or more transforms $T_i$ are transforms of the type set out in section 2 above for the purpose of implementing white-box protection.

The white-box implementation of a decryption operation 210 receives, or is provided, or accesses the transformed version $T_i(CWn)$ of the at least one decryption key CWn. The white-box implementation of a decryption operation 210 also receives, or is provided, or accesses the received item of content $\{C\}_{CW_n}$. The white-box implementation 210 then performs the decryption operation on the encrypted at least part of the item of content $\{C\}_{CW_n}$ based on the at least one decryption key CWn to obtain an intermediate version (shown as $T_j(C)$ in FIG. 2) of the at least part of the item of content. For this, the white-box implementation of the decryption operation 210 operates using the transformed version $T_i(CWn)$ of the at least one decryption key CWn in order to perform the decryption operation according to (or based on) the at least one decryption key CWn. Section 2 above provides details about how such a decryption operation may be implemented as a white-box implementation. Additionally, EP2369778 (the entire disclosure of which is incorporated herein by reference) provides details on how the decryption operation 210 may be implemented in a white-box protected manner that uses the transformed version $T_i(CWn)$ of the at least one decryption key CWn.

As the decryption operation is implemented using a white-box implementation 210, the value(s) of the one or more decryption keys CWn are kept hidden from an attacker, even though the decryption operation is performed based, or in accordance with, the one or more decryption keys CWn.

Preferably, the intermediate version $T_j(C)$ is a representation of the at least part of the item of content (C) in a transform domain, based on one or more transforms $T_j$. The one or more transforms $T_j$ are transforms of the type set out in section 2 above for the purpose of implementing white-box protection. For example, the one or more transforms $T_j$ may be implemented, or combined/merged with, one or more of the processing steps of the decryption operation that is implemented using the white-box implementation 210 (so that the application of these one or more transforms $T_j$ cannot be removed or discovered by an attacker). This helps prevent an attacker from accessing a cleartext version of the at least part of the item of content (C) at the output of the white-box implementation of the decryption operation 210.

The one or more transforms $T_j$ may be unique, or specific to the device 200 (or to a group of devices that comprises the specific device 200)—this can be achieved, for example, by providing the device 200 with its own bespoke version of the CA client 204 (i.e. a specific/unique implementation of the CA client 204 corresponding to a particular device or group of devices).

The white-box implementation of an encryption operation 212 receives, or is provided, or accesses the intermediate version $T_j(C)$. The white-box implementation 212 then performs the encryption operation on the intermediate version $T_j(C)$ based on at least one encryption key (corresponding to one or more decryption keys DK) to obtain re-encrypted content (shown as $\{C\}_{DK}$ in FIG. 2). If the encryption operation uses, or is based on, a symmetric encryption algorithm, then the at least one encryption key may be the same as the corresponding one or more decryption keys DK. The one or more encryption keys may be protected from white-box attacks by virtue of being embedded (e.g. in a transformed form) within the code for the white-box implementation of the encryption operation 212. Alternatively, the device 200 may be arranged to receive a transformed version of these one or more encryption keys and to provide the transformed version of these one or more encryption keys as an input to the white-box implementation of the encryption operation 212, in a similar manner to that in which the white-box implementation of the decryption operation 210 obtains the transformed version of the one or more decryption keys.

The white-box implementation of the encryption operation 212 may compensate for the one or more transforms $T_j$ that are used for the intermediate version $T_j(C)$, as will be apparent from the discussion above in section 2. Again, the "undoing" of the one or more transforms $T_j$ may be merged with other data operations of the encryption operation 212, so that an attacker cannot discover the one or more transforms $T_j$ from the white-box implementation of the encryption operation 212.

The white-box implementation of the encryption operation 212 therefore outputs re-encrypted content $\{C\}_{DK}$.

The CA client 204 also comprises, or stores, a rights object (or DRM license), represented in FIG. 2 as RO(DK). The rights object comprises the one or more decryption keys DK in a protected form (e.g. in an encrypted form) or other information that enables the DRM client 206 to obtain the one or more decryption keys DK (e.g. a URL of a DRM server from which decryption keys may be downloaded). For example, the one or more decryption keys DK may be encrypted using a key $K_{DRM}$ that that DRM client 206 knows or has access to, so that the DRM client 206, upon receiving the rights object, may obtain the one or more decryption keys DK.

In some embodiments, the rights object is stored as part of the (protected) code for the CA client 204. In other embodiments, the CA client 204 is arranged to receive the rights object (e.g. from a head-end or DRM server of a DRM system), so that the CA client 204 may then store or have access to the rights object. The rights object may be received by the device 200 this way at the same time as (i.e. along with) receiving the transformed version of the one or more encryption keys.

Thus, the CA client 204 may output (a) a rights object that enables the DRM client 206 to obtain one or more decryption keys DK corresponding to the at least one encryption key used by the white-box implementation of the encryption operation 212, where these one or more decryption keys DK enable the DRM client 206 to decrypt the re-encrypted content $\{C\}_{DK}$ and (b) the re-encrypted content $\{C\}_{DK}$ itself. The rights object and the re-encrypted content $\{C\}_{DK}$ may then be provided to the DRM client 206 for the DRM client 206 to process as normal. The device 200 (possibly the CA client 204) may comprise, or may be arranged to execute, a DRM packager that is arranged to receive the rights object and the re-encrypted content $\{C\}_{DK}$ and create a DRM object that contains the rights object and the re-encrypted content $\{C\}_{DK}$ and that is suitable for (or complies with) an input interface or standard of the DRM client 206—it may then be this DRM object that is provided to the DRM client 206.

As mentioned above, the CA client 204 obtains the transformed version $T_i(CWn)$ of the one or more decryption keys CWn. In some embodiments, the device 200 receives (at the input 202) the transformed version $T_i(CWn)$ of the one or more decryption keys CWn (for example, the provider of the item of content (C) or a head-end of a CA system may provide the transformed version $T_i(CWn)$ to the device 200, for example in one or more entitlement control messages).

Alternatively, the CA client 204 may comprise a key manager module 214 (which may also be implemented as a white-box implementation). The key manager module 214 may be arranged to receive key information (for example, via one or more entitlement control messages and/or one or more entitlement management messages) and to generate the transformed version $T_i(CWn)$ of the one or more decryption keys CWn based on the received key information. An example of this is set out in EP2227015, the entire disclosure of which is incorporated herein by reference—it will be appreciated that other methods may be used. Preferably, at no point is a cleartext value of the one or more decryption keys CWn generated by the key manager module 214.

The one or more transforms $T_i$ may be unique, or specific to the device 200 (or to a group of devices that comprises the specific device 200)—this can be achieved, for example, by providing the device 200 with its own bespoke version of the CA client 204 (i.e. a specific/unique implementation of the CA client 204 corresponding to a particular device or group of devices).

The key data received at the input 202 may be received together with (e.g. in the same transport stream) the item of content $\{C\}_{CWn}$. Alternatively, the key data received at the input 202 may be received separately from the item of content $\{C\}_{CWn}$.

Figure 3:
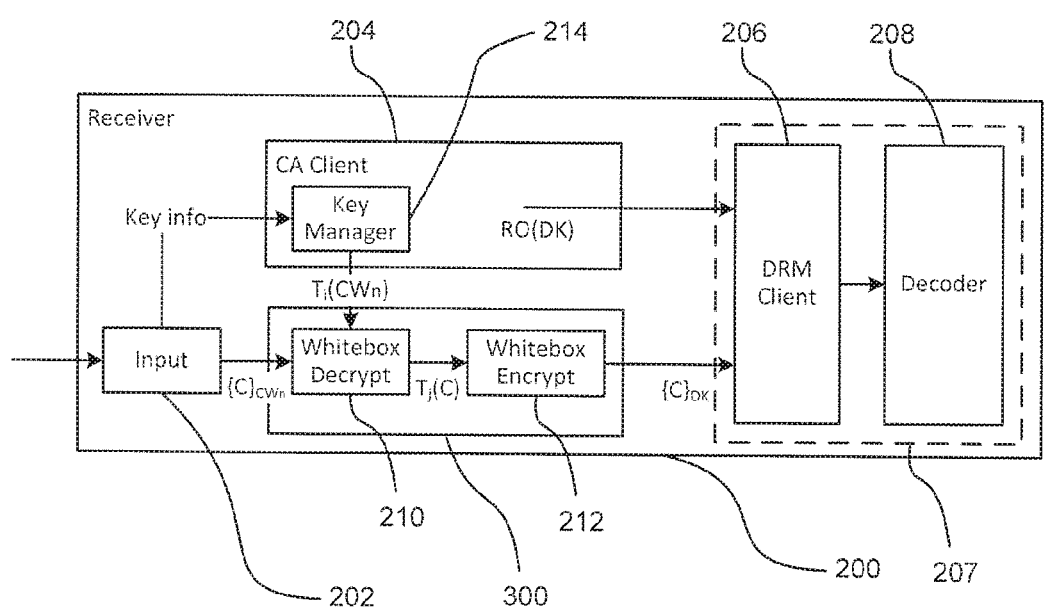
FIG. 3 schematically illustrates a device (or receiver) according to another embodiment of the invention.

In the example embodiment shown in FIG. 2, the CA client 204 comprises the key manager 214 (to perform the usual/known CA key management functionality) as well as the white-box implementations of the decryption operation 210 and encryption operation 212. Thus, the CA client 204 of FIG. 2 may be viewed as an "extended" CA client or a "CA-bridge" client, since prior art CA clients do not involve, or provide, the content transcryption that is performed by the decryption operation 210 and encryption operation 212. In an alternative embodiments shown in FIG. 3, the white-box implementations of the decryption operation 210 and encryption operation 212 are part of a transcryption module 300 that is separate from the CA client 204 (with the CA client providing the transformed version of the one or more decryption keys to the transcryption module 300). Thus, a more "standard" CA client 204 may be used together with the transcryption module 300, to thereby form a bridge between the CA client 204 and the DRM client 206.

In one embodiment, therefore, there is provided a method M of providing access to content at a first device 200, the method comprising:

receiving an item of content $\{C\}_{CWn}$, wherein at least part of the item of content is encrypted, the encrypted at least part of the item of content being decryptable using at least one decryption key;

in a first software client:
  obtaining a transformed version $T_i(CWn)$ of the at least one decryption key;
  performing a decryption operation on the encrypted at least part of the item of content based on the at least one decryption key to obtain an intermediate version $T_j(C)$ of the at least part of the item of content, wherein said performing the decryption operation uses a white-box implementation of the decryption operation 210 that forms part of the first software client and that operates using the transformed version of the at least one decryption key;
  performing an encryption operation on at least a portion of the intermediate version based on at least one encryption key to obtain re-encrypted content $\{C\}_{DK}$, wherein said performing the encryption operation uses a white-box implementation of the encryption operation 212 that forms part of the first software client;
  providing, to a DRM client 206 that executes on the first device, (a) a rights object that enables the DRM client 206 to obtain one or more second decryption keys corresponding to the at least one encryption key, the one or more second decryption keys enabling the DRM client 206 to decrypt the re-encrypted content and (b) the re-encrypted content.

Here, the first software client may be the transcryption module 300, the CA client 204, or part of the CA client 204 (formed, at least in part, by the white-box implementation of the decryption operation 210 and white-box implementation of the encryption operation 212).

4—Modifications

In some embodiments, the CA client 204 may be arranged to modify the intermediate version $T_j(C)$ prior to the white-box implementation of the encryption operation 212 encrypting the intermediate version $T_j(C)$. Such modifications may comprise one or more of: (a) embedding a watermark in at least a part of the intermediate version; (b) embedding a fingerprint in at least a part of the intermediate (here, the fingerprint may identify, for example, the device 200 and/or the CA client 204 and/or the DRM client 206); and (c) converting the intermediate version $T_j(C)$ from a first format to a second format (for example, moving from one data compression format, which may be a format the that DRM client 206 is not able to handle/process, to a data compression format that the DRM client 206 is configured to handle/process).

The DRM client 206 and the decoder 208 will, in general, be pre-installed on the device 200 (as they will, in most embodiments of the invention, be implemented in the trusted execution environment). The CA client 204 may itself, however, be downloaded to, or loaded/installed on, the device 200 at any point in time, including after a user has purchased (and is in possession of) the device 200. For example, the CA client 204 may be a software application made available for download from a website (such as an app store for a mobile telephone)—the user of the device 200 may then download the CA client 204 onto the device so that the above-mentioned benefits can be achieved. Similarly, with the embodiment of FIG. 3, the transcryption module 300 (or any computer program for carrying out the above-mentioned method M) may be a software application made available for download from a website (such as an app store for a mobile telephone)—the user of the device 200 may then download the transcryption module 300 onto the device so that the above-mentioned benefits can be achieved.

All of the example embodiments described above involve the CA client 204 executing on the same device as the DRM client 206 and decoder 208. In alternative embodiments, the CA client 204 (and the input 202) executes on a second device different/separate from the device 200 on which the DRM client 206 and decoder 208 execute. For example, the input 202 and CA client 204 may execute on a receiver (or set top box) that is connected, via a home network, to one or more devices, where at least one of those devices is arranged to execute the DRM client 206 and decoder 208. Alternatively, the input 202 and CA client 204 may execute on a receiver (or set top box) that stores the re-encrypted content on an intermediary device (such as a video server or a home media server)—this re-encrypted content can then be accessed at a later stage by a device that is arranged to execute the DRM client 206 and decoder 208

Preferably, the one or more encryption keys used by the white-box implementation of the encryption operation 212 are unique, or specific to the device 200 (or to a group of devices that comprises the specific device 200) or to the particular instance of the DRM client 206 on the device 200—this can be achieved, for example, by providing the device 200 with its own bespoke version of the CA client 204 (i.e. a specific/unique implementation of the CA client 204 corresponding to a particular device or group of devices or corresponding to the particular instance of the DRM client 206 on the device 200).

Preferably, the one or more encryption keys are not associated with the item of content—the purpose of the one or more encryption keys is to tie the CA client 204 with the DRM client 206, so that the CA client 204 can link with, or make use of and leverage, the properties of the DRM client 206 (such as being anchored to the device 200) and/or the functionality of the DRM client 206 (such as its ability to perform DRM processing in according with a particular DRM system) without the CA client 204 having to provide those properties or that functionality itself. The one or more encryption keys may be static. Alternatively, the one or more encryption keys may be updated, but this need not occur frequently, so that connectivity requirements (e.g. to a DRM server) are minimal.

In some embodiments, the input 202 receives the item of content $\{C\}_{CW_n}$ and/or transformed keys (or key information) for use by the CA client 204 via a broadcast network (such as a satellite communications network or a cable network). In some embodiments, the input 202 receives the item of content $\{C\}_{CW_n}$ and/or transformed keys (or key information) for use by the CA client 204 via a broadband network (which may comprise, for example, the Internet).

The CA client 204 may perform any associated CA processing. For example, the CA client 204 may perform known key-management functionality using the key manager 214. For example, the CA client 204 may be arranged to control the decryption operation 210 and/or the encryption operation 212 based, at least in part, on whether the CA client 204 detects a valid entitlement to access the item of content (C). Such an entitlement may be received by the CA client 204 via, for example, an entitlement management message, as is known in this field of technology. The CA client 204 may, for example, only provide the transformed version $T_i(CWn)$ of the one or more decryption keys (CWn) to the decryption operation 210 if the CA client 204 detects a valid entitlement, or may provide an invalid transformed version of the one or more decryption keys to the decryption operation 210 if the CA client 204 does not detect a valid entitlement.

The decryption operation 210 may be based, at least in part, on any decryption algorithm suitable for implementation via a white-box implementation (such as an AES decryption algorithm or a triple-DES decryption algorithm). Similarly, the encryption operation 212 may be based, at least in part, on any encryption algorithm suitable for implementation via a white-box implementation (such as an AES encryption algorithm or a triple-DES encryption algorithm). Some embodiments may make use of asymmetric encryption or decryption operations 210, 212, which may also be implemented as white-box implementations.

As discussed above, at least a portion of the intermediate version $T_j(C)$ is re-encrypted by the encryption operation 212. In some embodiments, this portion is not all of the intermediate version $T_j(C)$. In this case, at least some (or possibly all) of the item of content C that does not correspond to this portion may be provided to the DRM client 206 without having been re-encrypted, e.g. the decryption operation 210 may generate decrypted/plaintext parts of the item of content C which are not re-encrypted by the encryption operation 212, with those decrypted/plaintext parts of the item of content C being passed to the DRM client 206 (potentially as part of a DRM object, i.e. along with the re-encrypted content $\{C\}_{DK}$). This helps save on the amount of processing performed by the device 200. As an example, the re-encryption may be of a video component of a movie (the item of content), with the audio component of the movie not being re-encrypted.

All of the example embodiments described above make use of a CA client 204. In alternative embodiments, the CA client 204 is replaced by a second DRM client. This enables a second DRM system (to which the second DRM client corresponds) to provide access to content using a first DRM system (to which the first DRM client corresponds). In either case (i.e. whether a CA client 204 or a second DRM client 204) is used, embodiments of the invention enable content that is not compatible with a pre-installed DRM client 206 on the device 200 to be accessed on the device 200 in a secured/protected manner.

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then one or more storage media and/or one or more transmission media storing or carrying the computer program form aspects of the invention. The computer program may have one or more program instructions, or program code, which, when executed by one or more processors (or one or more computers), carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, byte code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of providing access to content at a first computing device, the method comprising:
  receiving an item of content, wherein at least part of the item of content is encrypted, the encrypted at least part of the item of content being decryptable using at least one decryption key;
  in a first software client executing on a computing device:
  obtaining a transformed version of the at least one decryption key;
  performing a decryption operation on the encrypted at least part of the item of content based on the at least one decryption key to obtain an intermediate version of the at least part of the item of content, wherein said performing the decryption operation uses a white-box implementation of the decryption operation that forms part of the first software client and that operates using the transformed version of the at least one decryption key; and
  performing an encryption operation on at least a portion of the intermediate version of the at least part of the item of content based on at least one encryption key to obtain re-encrypted content, wherein said performing the encryption operation uses a white-box implementation of the encryption operation that forms part of the first software client; and
  providing, to a digital rights management client that executes on the first computing device and that is anchored to the first computing device, (a) a rights object that enables the digital rights management client to obtain one or more second decryption keys corresponding to the at least one encryption key, the one or more second decryption keys enabling the digital rights management client to decrypt the re-encrypted content and (b) the re-encrypted content.

2. The method of claim 1, wherein the first software client executes on the first computing device.

3. The method of claim 1, wherein the first software client executes on a second computing device different from the first computing device.

4. The method of claim 1, wherein the digital rights management client is arranged to execute in a protected hardware processing environment of the first computing device.

5. The method of claim 1, wherein the at least one encryption key is: (a) unique to the first computing device or (b) unique to a predetermined group of devices that includes the first computing device or (c) unique to the instance of the DRM client that executes on the first computing device.

6. The method of claim 1, wherein the first software client is one of:
  (a) a conditional access client;
  (b) part of a conditional access client;
  (c) a second digital rights management client;
  (d) part of a second digital rights management client.

7. The method of claim 1, wherein the first software client is not anchored to the computing device on which the first software client executes.

8. The method of claim 1, wherein the first software client is arranged to execute in an unprotected hardware processing environment of the computing device on which the first software client executes.

9. The method of claims 1, comprising the first software client receiving a transformed version of the at least one encryption key.

10. The method of claims 1, wherein code for the first software client has embedded therein a transformed version of the at least one encryption key.

11. The method of claims 1, wherein code for the first software client has embedded therein the rights object.

12. The method of claims 1, wherein the first software client is arranged to control the decryption operation and/or the encryption operation based, at least in part, on whether the first software client detects a valid entitlement to access the item of content.

13. The method of claim 1, comprising the first software client obtaining the transformed version of the at least one decryption key from one or more entitlement control messages communicated over a broadcast network.

14. The method of claim 1, wherein the item of content is received over a broadcast network.

15. The method of claim 1, wherein the item of content is received over a broadband network.

16. The method of claim 15, wherein the broadband network comprises the Internet.

17. The method of claim 1, wherein the at least one encryption key is independent of the item of content.

18. The method of claim 1, wherein:
(a) the decryption operation is based, at least in part, on an AES decryption algorithm or on a triple-DES decryption algorithm; and/or
(b) the encryption operation is based at least in part, on an AES encryption algorithm or on a triple-DES encryption algorithm.

19. The method of claim 1, wherein a transformation applied to the at least one decryption key to obtain the transformed version of the at least one decryption key is associated with the particular white-box implementation of the decryption operation that forms part of the first client software.

20. The method of claim 1, wherein the decryption operation and the encryption operation operate, at least in part, on data in one or more transform domains different from a domain for data of the item of content.

21. The method of claim 1, wherein the white-box implementation of the decryption operation and/or the white-box implementation of the encryption operation is unique to the computing device on which the first software client executes or to a predetermined group of computing devices that includes the computing device on which the first software client executes.

22. The method of claim 1, comprising modifying the intermediate version of the at least part of the item of content prior to encrypting the intermediate version of the at least part of the item of content, the encrypting then comprising encrypting at least a portion of the modified intermediate version of the at least part of the item of content.

23. The method of claim 22, wherein the modifying of the intermediate version of the at least part of the item of content comprises one or more of:
(a) embedding a watermark in at least a part of the intermediate version of the at least part of the item of content;
(b) embedding a fingerprint in at least a part of the intermediate version of the at least part of the item of content; and
(c) converting the intermediate version of the at least part of the item of content from a first format to a second format.

24. The method of claim 1, wherein the at least a portion of the intermediate version of the at least part of the item of content is not all of the intermediate version of the at least part of the item of content.

25. The method of claim 24, comprising providing at least some of the item of content that does not correspond to the at least a portion of the intermediate version of the at least part of the item of content to the digital rights management client.

26. The method of claim 1, wherein the first computing device comprises one of:
(a) a mobile telephone;
(b) a tablet computer;
(c) a portable personal electronics device;
(d) a games console;
(e) a personal computer;
(f) a television;
(g) a set top box.

27. The method of claim 1, wherein the white-box implementation of the decryption operation and the white-box implementation of the encryption operation are implemented together as a single white-box implementation.

28. An apparatus comprising:
one or more computer processors; and
one or more computer memories coupled to the one or more computer processors and storing instructions which, when executed by the one or more computer processors, cause the one or more computer processors to:
receive an item of content, wherein at least part of the item of content is encrypted, the encrypted at least part of the item of content being decryptable using at least one decryption key;
in a first software client:
obtain a transformed version of the at least one decryption key;
perform a decryption operation on the encrypted at least part of the item of content based on the at least one decryption key to obtain an intermediate version of the at least part of the item of content, wherein said performing the decryption operation uses a white-box implementation of the decryption operation that forms part of the first software client and that operates using the transformed version of the at least one decryption key; and
perform an encryption operation on at least a portion of the intermediate version of the at least part of the item of content based on at least one encryption key to obtain re-encrypted content, wherein said performing the encryption operation uses a white-box implementation of the encryption operation that forms part of the first software client; and
provide, to a digital rights management client that executes on a first computing device and that is anchored to the first computing device, (a) a rights object that enables the digital rights management client to obtain one or more second decryption keys corresponding to the at least one encryption key, the one or more second decryption keys enabling the digital rights management client to decrypt the re-encrypted content and (b) the re-encrypted content.

29. One or more non-transitory computer-readable media storing a computer program which, when executed by one or more processors, causes the one or more processors to carry out a method of providing access to content at a first computing device, the method comprising:

receiving an item of content, wherein at least part of the item of content is encrypted, the encrypted at least part of the item of content being decryptable using at least one decryption key;

in a first software client:

obtaining a transformed version of the at least one decryption key;

performing a decryption operation on the encrypted at least part of the item of content based on the at least one decryption key to obtain an intermediate version of the at least part of the item of content, wherein said performing the decryption operation uses a white-box implementation of the decryption operation that forms part of the first software client and that operates using the transformed version of the at least one decryption key; and performing an encryption operation on at least a portion of the intermediate version of the at least part of the item of content based on at least one encryption key to obtain re-encrypted content, wherein said performing the encryption operation uses a white-box implementation of the encryption operation that forms part of the first software client; and providing, to a digital rights management client that executes on the first computing device and that is anchored to the first computing device, (a) a rights object that enables the digital rights management client to obtain one or more second decryption keys corresponding to the at least one encryption key, the one or more second decryption keys enabling the digital rights management client to decrypt the re-encrypted content and (b) the re-encrypted content.

* * * * *